(12) United States Patent
Svensson et al.

(10) Patent No.: US 6,948,890 B2
(45) Date of Patent: Sep. 27, 2005

(54) DRILL HAVING INTERNAL CHIP CHANNEL AND INTERNAL FLUSH CHANNEL

(75) Inventors: Mattias Svensson, Skärblacka (SE); Mikael Grönquist, Norrköping (SE); Johnny Bruhn, Våsterfårnebo (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 10/841,575

(22) Filed: May 10, 2004

(65) Prior Publication Data

US 2005/0047879 A1 Mar. 3, 2005

(30) Foreign Application Priority Data

May 8, 2003 (SE) .............................................. 0301338

(51) Int. Cl.[7] .............................................. B23B 51/06
(52) U.S. Cl. ........................................... 408/59; 408/56
(58) Field of Search .............................. 408/56–57, 59, 408/227, 144, 226; B23B 51/06

(56) References Cited

U.S. PATENT DOCUMENTS

| 5,451,126 | A | * | 9/1995 | Brun .......................... 408/1 R |
| 5,544,985 | A | * | 8/1996 | Lane ............................ 408/56 |
| 5,820,313 | A | * | 10/1998 | Weber ......................... 408/56 |
| 5,964,553 | A | | 10/1999 | Blomberg et al. |
| 5,984,595 | A | * | 11/1999 | Mizoguchi .................... 408/57 |
| 5,993,119 | A | * | 11/1999 | Moller ......................... 408/57 |
| 6,086,292 | A | * | 7/2000 | Yokoyama .................... 408/67 |
| 6,164,881 | A | * | 12/2000 | Shono ........................ 409/137 |
| 6,315,504 | B1 | * | 11/2001 | Sekiguchi et al. .......... 408/144 |
| 6,398,468 | B1 | * | 6/2002 | Bayer et al. ................. 409/135 |

FOREIGN PATENT DOCUMENTS

| JP | 57015608 A | * | 1/1982 | ........... B23B/51/06 |
| JP | 59209709 A | * | 11/1984 | ........... B23B/51/06 |

* cited by examiner

Primary Examiner—Derris H. Banks
Assistant Examiner—J Williams
(74) Attorney, Agent, or Firm—Burns, Doane, Swecker & Mathis, LLP

(57) ABSTRACT

A drill for chip removing machining includes a front cutting end, a rear securing portion, and a shank extending therebetween. The cutting end includes at least one cutting edge. The drill has at least one internal chip channel and at least one internal flush channel formed in a longitudinal pillar portion of the drill. All portions of the drill are formed of the same material, such as cemented carbide, wherein the chip channel has a surface roughness no greater than 0.5 μm.

18 Claims, 5 Drawing Sheets

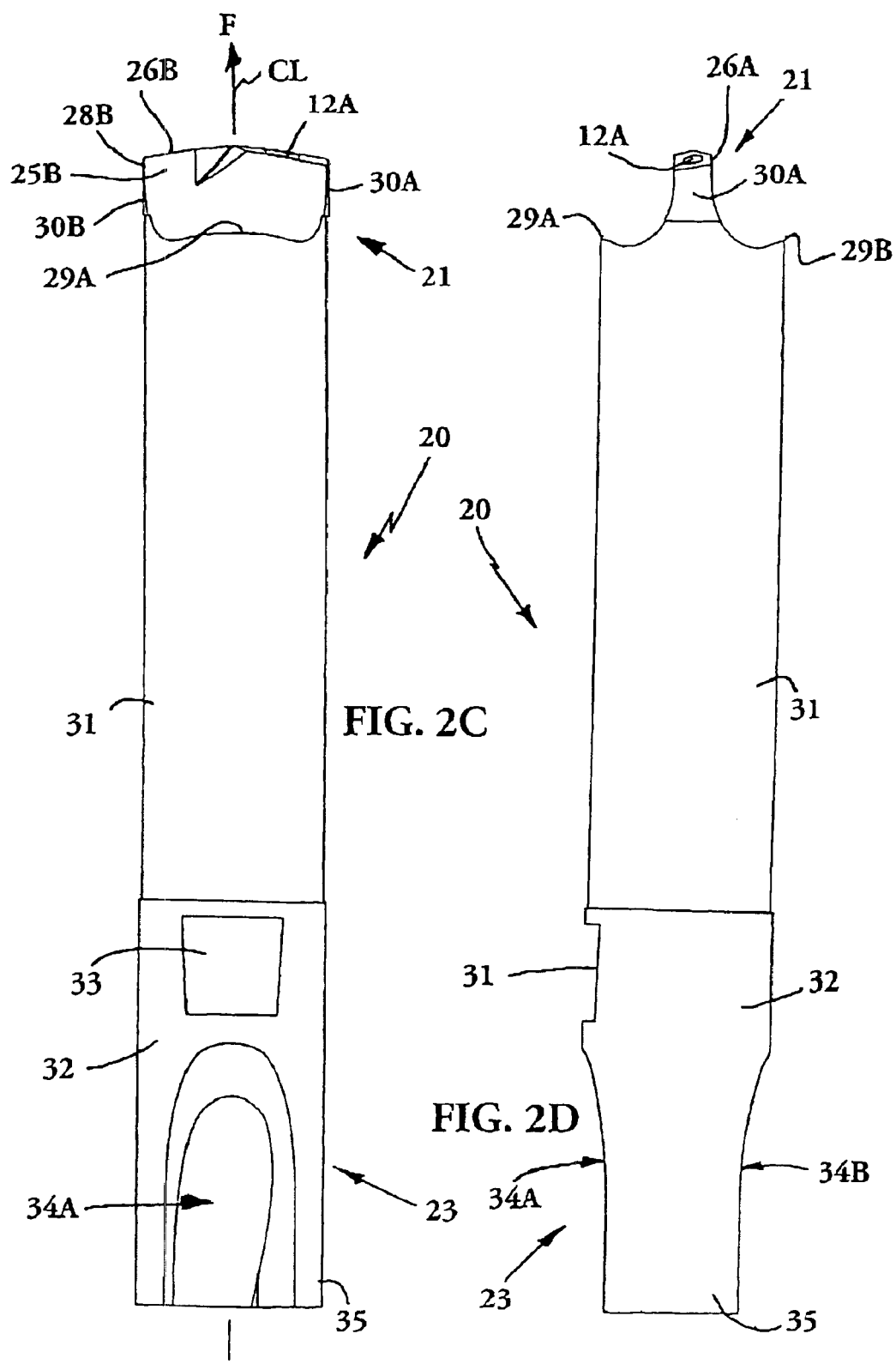

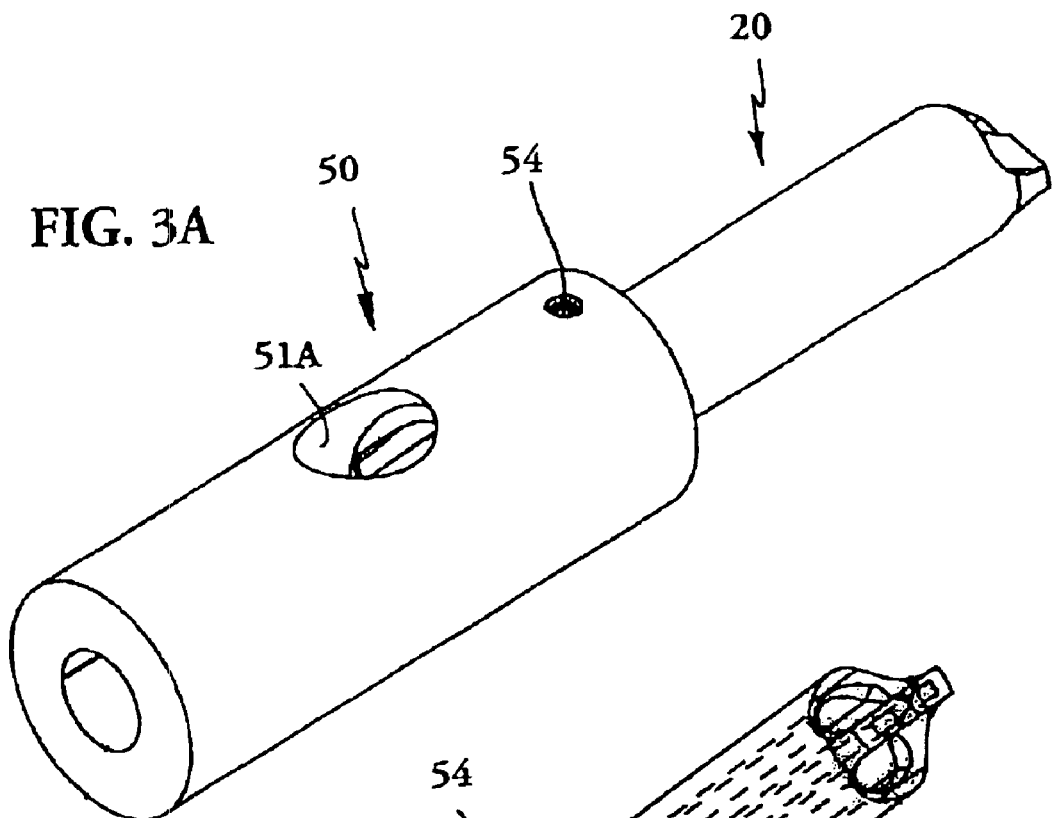
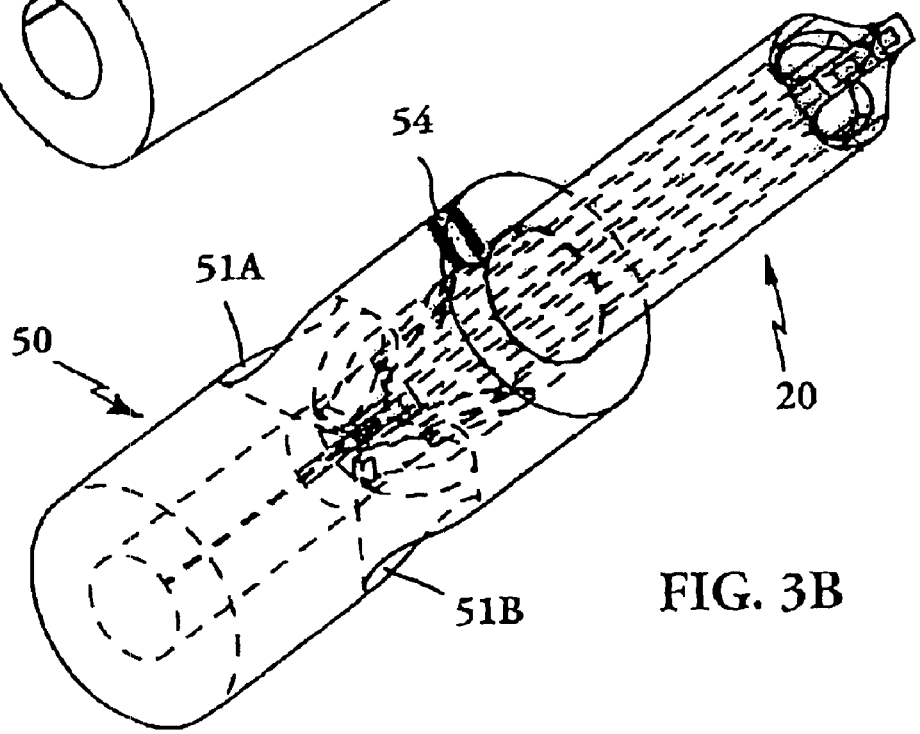

DRILL HAVING INTERNAL CHIP CHANNEL AND INTERNAL FLUSH CHANNEL

This application claims priority under 35 U.S.C. §119 to patent application Ser. No. 0301338-0 filed in Sweden on May 8, 2003, the entire content of which is hereby incorporated by reference.

THE FIELD OF THE INVENTION

The present invention relates to a tool, such as a drill, for chip removing machining and to a blank for making the tool.

PRIOR ART

A conventional cemented carbide drill has open (external) chip spaces (flutes) on its outer periphery that have been ground from a solid cylindrical bar. These bars are also available with preformed flushing holes for internal cooling. During a cutting operation, the cooling fluid flushes the chips upwardly through the chip spaces. The problem is that the chip space, for an efficient drill, must be large, which implies large costs since much material must be ground away. The large chip spaces also weaken the drill above all in the sense of torsional and bending rigidity. Another problem is that the chips that are transported up through an external chip space score the bore wall on the workpiece that is machined.

There are today so called ejector drills (see for example U.S. Pat. No. 5,964,553), include internal flush channels which lead (flush) the chips internally, which solves the wall-scoring problem. The known tool is made of steel, which makes no improvement regarding rigidity or stability in comparison with a conventional drill of solid cemented carbide. In addition the known drill is complicated to manufacture and suited for drilling large holes only, i.e., generally greater than 20 mm in diameter.

OBJECTS OF THE INVENTION

One object of the present invention is to provide an efficient drilling tool with a large chip space.

Another object of the present invention is to provide a rigid drilling tool also for smaller hole diameters.

Another object of the present invention is to provide a drilling tool where the chips do not score the bore wall on the workpiece that is machined.

Another object of the present invention is to provide a drilling tool and a blank that are simple to manufacture.

Another object of the present invention is to provide a drilling tool that has extensive possibilities to be reground after wear.

SUMMARY OF THE INVENTION

At least the primary objects of the present invention are obtained by a drill for chip removing machining, the drill comprising a body which defines a longitudinal axis and has a front cutting end, a rear securing portion, and a shank extending between the front cutting end and the rear securing portion. The cutting end includes at least one cutting edge. The body further includes at least one flush channel for conducting flushing fluid forwardly to the cutting end, and at least one chip channel for conducting away flushing fluid and cuttings rearwardly from the cutting end. The at least one chip channel has entrance and exit ends and is disposed internally of the body between the entrance and exit ends.

Another aspect of the invention relates to a blank from which the drill is to be machined. The blank includes a body which defines a longitudinal axis and has a plurality of generally longitudinally extending internal through-holes which include at least one internal flush channel hole and at least one internal chip channel hole. The entire body is formed of the same material.

SHORT DESCRIPTION OF THE DRAWINGS

FIG. 2C shows the drilling tool in a side view.

FIG. 2D shows the drilling tool in another side view.

FIG. 3A shows the drilling tool in a holder, in a perspective view.

FIG. 3B shows the drilling tool in the holder in another perspective view.

DETAILED DESCRIPTION OF A PREFERRED EMBODIMENT

Figure 1A:
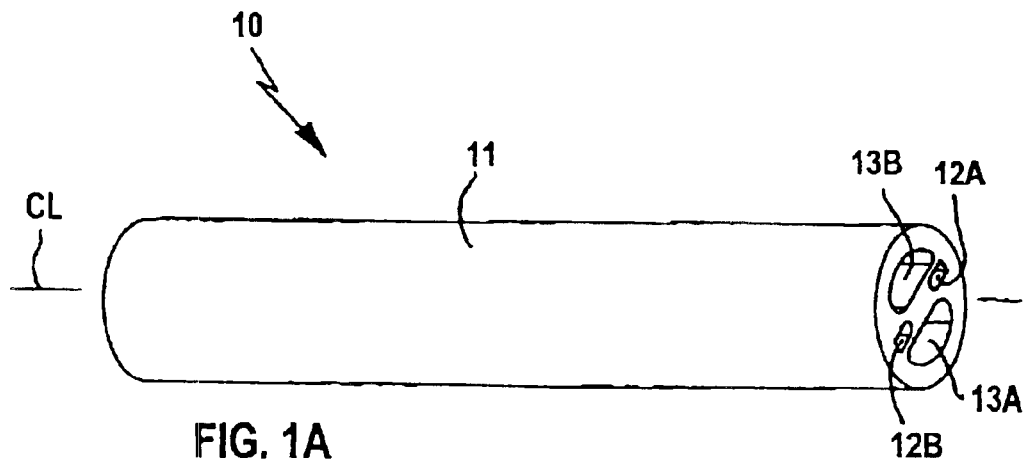
FIG. 1A shows a blank according to the present invention in a perspective view.
Figure 2A:
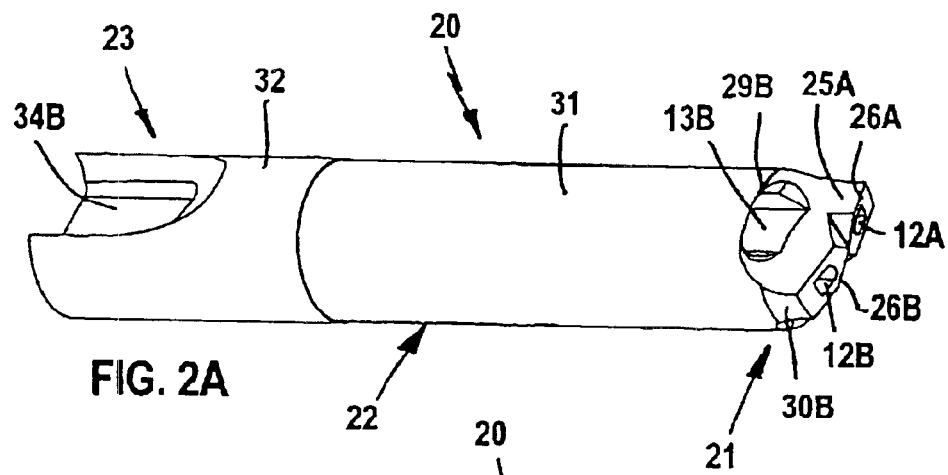
FIG. 2A shows a drilling tool according to the present invention in a perspective view, the tool having been made from the blank of FIGS. 1A, 1B.
Figure 2B:
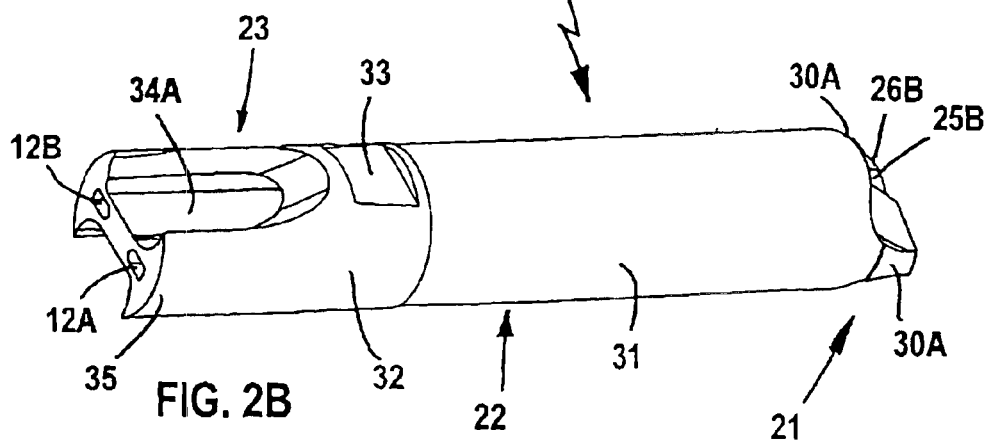
FIG. 2B shows the drilling tool in another perspective view.
Figure 2E:
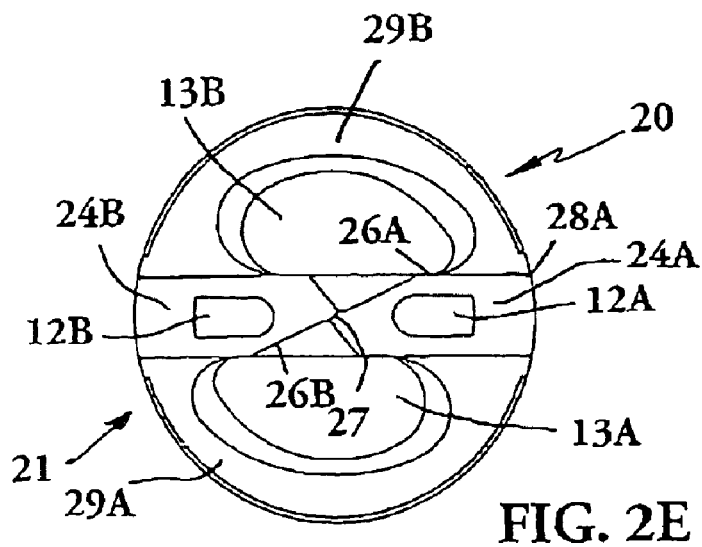
FIGS. 2E and 2F show the drilling tool in opposite end views.
Figure 2F:
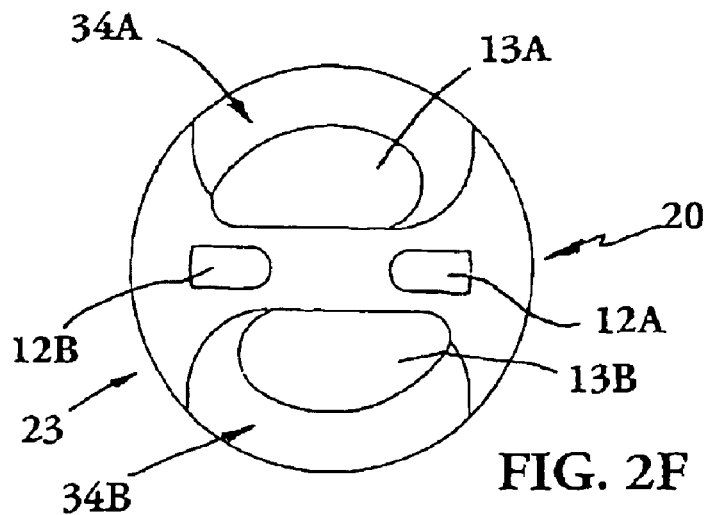
Figure 1B:
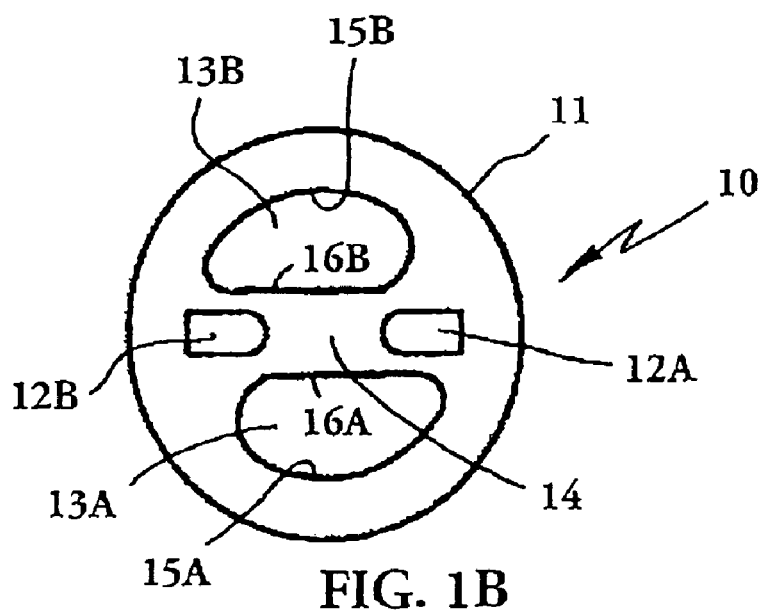
FIG. 1B shows the blank of FIG. 1 in an end view.

In FIGS. 1A and 1B is shown a blank 10 according to the present invention from which can be machined a drilling tool according to the present invention. The blank 10 is made of a tube 11 of cemented carbide, such as extruded cemented carbide. The blank is extruded starting from a hard constituent (for example tungsten carbide, WC) and a binder phase (for example cobalt, Co) according to the following. Cemented carbide powder with certain cobalt content and a bearer, for example plastics, is mixed and shaped into pellets or granulate. The bearer will constitute the matrix in a green body, i.e. the blank before sintering. By "cobalt" shall here be understood to mean a metallic binder phase, which alternatively can replaced by or comprise other metals, for example nickel, Ni. Subsequently, the mixture is preheated to a suitable temperature and is inserted into a machine for extrusion. Then the mixture is pressed forwards under high pressure and certain temperature, about 180° C., to a mouthpiece whereby an essentially cylindrical bar of certain internal geometry is formed. Then the bar is heated in a separate oven such that the bearer is burned away and such that the binder metal melts and binds the carbides. Then, subsequent machining of the blank 10 occurs, such as grinding of for example ends and shank to form a tool shown in FIGS. 2A–2F.

Alternatively, the blank can be extruded from two different cemented carbide grades where the difference foremost consists in balance between the hard constituent and the binder phase. Thereby a still harder and more rigid "shell" of the blank is obtained as well as a tougher mid portion where the cutting speed of the drill is always lower.

Figure 4:
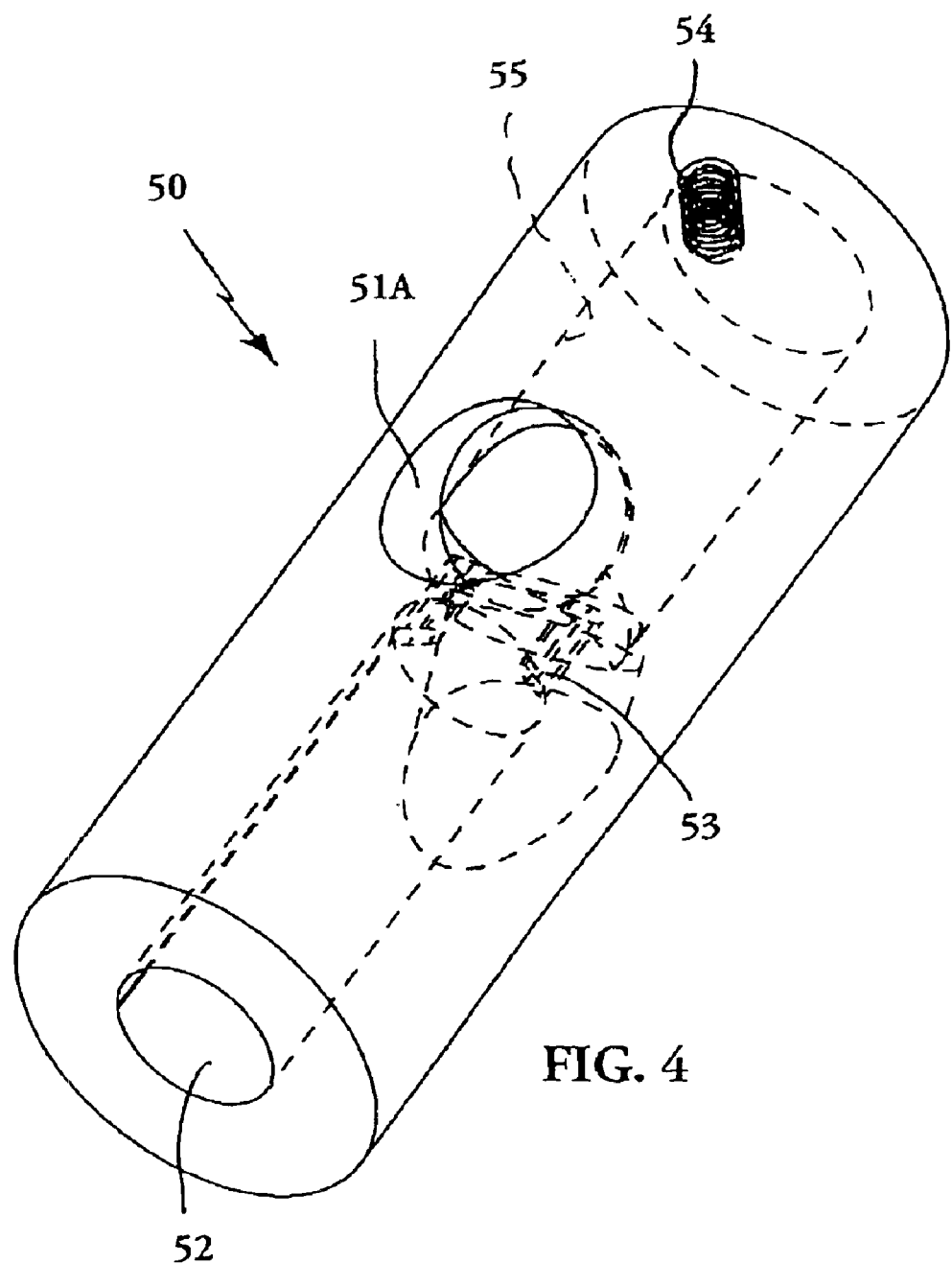
FIG. 4 shows the holder in a perspective view.

The tube 11 has a straight cylindrical, elongated basic form. The blank has the same cross-section along its entire length. The tube 11 comprises an internal, integral spar or pillar 14, which extends along the entire blank and divides the internal space of the tube in two substantially equally large portions. The blank has four longitudinal and throughgoing holes or spaces, i.e. two such spaces intended to form internal flushing channels 12A, 12B and two spaces intended to form internal chip )chip return) channels 13A, 138. The flushing channels 12A, 12B and the chip channels 13A, 13B are formed internally in the pillar 14 during the extrusion process, the flushing channels 12A, 12B being spaced from one another in a direction laterally of a longitudinal centerline of the body. Each flush channel has a substantially rectangular cross-section with one short side rounded, i.e. the side facing towards the centerline CL of the blank. Each space extends parallel to the centerline CL due to the extrusion process. The flush channel is provided at a certain distance from the centerline. Each flush channel has a greater dimension in the radial direction of the pillar 14 than in a direction perpendicularly thereto according to FIG. 1B. The pillar 14 is substantially symmetrically provided on each side of the centerline CL and delimits the chip channels 13A, 13B. Each chip channel and each flushing channel constitutes an internal channel, meaning that each chip channel is substantially closed in the radially outer direction as it extends longitudinally through the blank. The chip channels are limited by the tube internal wall 15A, 15B and a bordering surface 16A, 16B(see FIG. 4D) of the pillar 14. The surface roughness due to this type of manufacturing becomes advantageous for chip transport, i.e. the chip channels 13A, 13B obtain a $R_a$ value that is maximum 0.5 $\mu$m, preferably 0.3 $\mu$m or lower.

In FIGS. 2A–2F a drilling tool 20 according to the present invention is shown. The drilling tool comprises a cutting end 21, a shank 22 and a securing portion 23, which are produced from the blank 10, preferably by grinding.

The cutting end 21 is essentially chisel-shaped. The outer diameter of the cutting end 21 is chosen within the interval of 10–40 mm. The end 21 has two upper clearance surfaces 24A, 24B with associated rake faces 25A, 25B, wherein main cutting edges 26A, 26B for drilling are provided at lines of intersection between respective rake and clearance surfaces. The cutting edges 26A, 26B preferably connect to each other via a chisel edge 27 that intersects the center line CL. The edges 26A, 26B can be provided with strengthening chamfers and/or chip dividing recesses. The radially extreme end of each main cutting edge connects to an axially directed secondary cutting edge 28A, 28B. The secondary cutting edge 28A, 28B is formed along the line of intersection between the rake face 25A, 25B and a protrusion 30A, 30B, which is provided peripherally on the cutting end 21. The protrusion 30A, 30B coincides with the largest diameter of the cutting end and its dimension in the axial direction is shorter than the diameter of the end 21. The axial dimension of said projection is 1–7 mm. The protrusion acts as a support for the cutting forces during drilling such that hole deviation is reduced. The protrusion 30A, 30B can alternatively be circumferentially divided by, or be limited by, recesses in order to diminish torque during drilling, The cutting end comprises relatively centrally provided cut-in portions intended to diminish the resistance against impression of the drill such that the requisite feed force in the feed direction F can be reduced. The cut-in portions can be formed in several ways.

Each chip channel 13A, 13B has an entrance 29A, 29B. The entrance 29A, 29B has a conical axial cross-section with the tip directed in the feed direction F of the drill tool and with a surface that is cylindrical and parallel with the center line CL. The tip diminishes the resistance to chip flow from the cutting end 21. The internal chip channels 13A, 13B are consequently substantially radially closed, that is they do not open radially outwardly at least along the extension of the shank 22. The discharge orifice of each flushing channel 12A, 12B is provided axially in front of the entrances of the chip channels 13A, 13B relative to the drill feed direction F. Each channel 12A, 12B, 13A and 13B extends parallel to the centerline CL.

The shank 22 is cylindrical and has an outer diameter that is somewhat less than the outer diameter of the cutting end 21 in order to diminish energy consumption and scoring of the bore wall. The jacket surface 31 of the shank 22 is preferably substantially parallel with the centerline CL.

The jacket surface 32 of the securing portion 23 is cylindrical and preferably substantially parallel with the centerline CL, its outer diameter being preferably substantially the same as the outer diameter of the cutting end 21. The securing portion comprises a planar surface or flat 33 intended to be engaged by an end of a screw 54, or similar, mounted in a holder 50 in conventional manner. Two exit recesses 34A, 34B open the chip channels 13A, 13B radially outwardly at the other end 35 of the securing portion, axially beyond the planar surface 33. The recesses 34A, 34B are intended to conduct chips and flush medium via corresponding openings 51A, 51B which are preferably directed obliquely rearwardly in the holder 50. The envelope surface 32 is however maintained to the utmost possible extent at the end surface 35 between the recesses 34A, 34B in order to obtain stability during drilling. The holder 50 has a central intake channel 52, which is intended to supply fluid to the flushing channels via intermediate channels 53 having a similar order of magnitude as the flushing channels 12A, 12B. The shank portion of the drill 20 shall be inserted in a cylindrical recess 55 in the holder. The recess 55 has a bottom against which the end surface of the drill will abut such that the flushing channels are aligned with the channels 53.

Consequently, all of the drill portions are formed of the same material, for example extruded cemented carbide, where the tip is ground for drilling operations and its rear end is ground for chip evacuation. The drill comprises two small flush channels for supply of cooling fluid and two large channels for chip evacuation. A steel holder 50 holds the tube and coolant is supplied, wherein chips are both pushed and slung outwardly during drilling. During extrusion of the blank, chip flutes and flush channels are shaped to a finished condition. Thus, relatively little amount of material is needed for manufacturing the blank. This also implies that the prior art's most time-consuming grinding operation, i.e., grinding of external chip flutes, is avoided. Furthermore, maximum bending and torsional rigidity is obtained with a tube-shaped tool, which is of great importance for a drilling tool of solid cemented carbide, when the forces that set limits for the drill strength act in tangential and radial directions. An internal transport of chips through a chip channel that is disposed internally of the drill avoids scores on the bore wall of the workpiece and thereby deteriorated hole quality is avoided. The drilling tool can be reground numerous times.

The invention is in no manner limited to the above-described embodiment but may be varied freely within the limits of the subsequent claims. At least the cutting end 21 can be covered with one or more coatings of for example TiAlN, $Al_2O_3$, TiN and/or TiCN.

What is claimed is:

1. A drill for chip removing machining, comprising a body defining a longitudinal axis and having a front cutting end, a rear securing portion, and a shank extending between the front cutting end and the rear securing portion, the cutting end including at least one cutting edge, the body further including at least one internal flush channel for conducting flushing fluid forwardly to the cutting end, and at least one chip channel for conducting away flushing fluid and cuttings rearwardly from the cutting end, the at least one chip channel having entrance and exit ends and disposed internally of the body between the entrance and exit ends; wherein the body, the at least one cutting edge, the at least one flush channel, and at least one chip channel are formed of the same material.

2. The drill according to claim 1 wherein each of the at least one flush channel and chip channel extends parallel to the longitudinal axis.

3. The drill according to claim 1 wherein the at least one chip channel comprises two chip channels spaced apart by a pillar which comprises an integral part of the body and extends longitudinally along the body, the at least one flush channel being formed inside the pillar.

4. The drill according to claim 3 wherein the at least one flush channel comprises two flush channels.

5. The drill according to claim 1 wherein the body comprises cemented carbide, and the at least one chip channel has a surface roughness no greater than 0.5 µm.

6. The drill according to claim 1 wherein the at least one flush channel includes an exit end disposed axially forwardly of the entrance end of the at least one chip channel.

7. The drill according to claim 6 wherein the exit end of the at least one chip channel is disposed in the securing portion.

8. A drill blank including a body defining a longitudinal axis and having a plurality of generally longitudinally extending internal through-holes including at least one internal flush channel hole and at least one internal chip channel hole, the body formed entirely of the same material.

9. The blank according to claim 8 wherein the body comprises a straight cylindrical tube of substantially constant cross sectional configuration, wherein the at least one flush channel hole and chip channel hole extends parallel to the axis.

10. The blank according to claim 9 wherein the at least one chip channel hole comprises two chip channel holes spaced apart by a pillar portion of the body which extends longitudinally.

11. The blank according to claim 10 wherein the at least one flush channel hole comprises two flush channel holes disposed internally of the pillar.

12. The blank according to claim 8 wherein the blank is formed of cemented carbide.

13. The blank according to claim 12 wherein the at least one chip channel hole has a surface roughness no greater than 0.5 µm.

14. A drill for chip removing machining, comprising a body defining a longitudinal axis and having a front cutting end, a rear securing portion, and a shank extending between the front cutting end and the rear securing portion, the cutting end including at least one cutting edge, the body further including at least one internal flush channel for conducting flushing fluid forwardly to the cutting end, and at least one chip channel for conducting away flushing fluid and cuttings rearwardly from the cutting end, the at least one chip channel having entrance and exit ends and disposed internally of the body between the entrance and exit ends, wherein the at least one flush channel comprising a plurality of flush channels spaced from each other in a direction laterally of a longitudinal centerline of the body.

15. A drill for chip removing machining, comprising a body defining a longitudinal axis and having a front cutting end, a rear securing portion, and a shank extending between the front cutting end and the rear securing portion, the cutting end including at least one cutting edge, the body further including at least one internal flush channel for conducting flushing fluid forwardly to the cutting end, and at least one chip channel for conducting away flushing fluid and cuttings rearwardly from the cutting end, the at least one chip channel having entrance and exit ends, and disposed internally of the body between the entrance and exit ends, wherein each of the at least one flush channel and chip channel extends parallel to the longitudinal axis.

16. A drill for chip removing machining, comprising a body defining a longitudinal axis and having a front cutting end, a rear securing portion, and a shank extending between the front cutting end and the rear securing portion, the cutting end including at least one cutting edge, the body further including at least one internal flush channel for conducting flushing fluid forwardly to the cutting end, and at least one chip channel for conducting away flushing fluid and cuttings rearwardly from the cutting end, the at least one chip channel having entrance and exit ends and disposed internally of the body between the entrance and exit ends, wherein the at least one chip channel comprises two chip channels spaced apart by a pillar which comprises an integral part of the body and extends longitudinally along the body, the at least one flush channel being formed inside the pillar.

17. A drill for chip removing machining, comprising a body defining a longitudinal axis and having a front cutting end, a rear securing portion, and a shank extending between the front cutting end and the rear securing portion, the cutting end including at least one cutting edge, the body further including at least one internal flush channel for conducting flushing fluid forwardly to the cutting end, and at least one chip channel for conducting away flushing fluid and cuttings rearwardly from the cutting end, the at least one chip channel having entrance and exit ends and disposed internally of the body between the entrance and exit ends, wherein the body comprises cemented carbide, and the at least one chip channel has a surface roughness no greater than 0.5 µm.

18. A drill for chip removing machining, comprising a body defining a longitudinal axis and having a front cutting end, a rear securing portion, and a shank extending between the front cutting end and the rear securing portion, the cutting end including at least one cutting edge, the body further including at least one internal flush channel for conducting flushing fluid forwardly to the cutting end, and at least one chip channel for conducting away flushing fluid and cuttings rearwardly from the cutting end, the at least one chip channel having entrance and exit ends and disposed internally of the body between the entrance and exit ends, wherein the at least one flush channel includes an exit end disposed axially forwardly of the entrance end of the at least one chip channel.

* * * * *